United States Patent
Chadha

(10) Patent No.: US 12,423,465 B2
(45) Date of Patent: Sep. 23, 2025

(54) RANDOMIZING CHARACTER CORRECTIONS IN A MACHINE LEARNING CLASSIFICATION SYSTEM

(71) Applicant: RULE 14, Santa Monica, CA (US)

(72) Inventor: Ajit Singh Chadha, Santa Monica, CA (US)

(73) Assignee: RULE 14, Santa Monica, CA (US)

( * ) Notice: Subject to any disclaimer, the term of this patent is extended or adjusted under 35 U.S.C. 154(b) by 98 days.

(21) Appl. No.: 17/978,804

(22) Filed: Nov. 1, 2022

(65) Prior Publication Data

US 2023/0140546 A1     May 4, 2023

Related U.S. Application Data

(60) Provisional application No. 63/274,343, filed on Nov. 1, 2021.

(51) Int. Cl.
    *G06F 21/62*     (2013.01)
    *G06V 30/19*     (2022.01)

(52) U.S. Cl.
    CPC .... *G06F 21/6245* (2013.01); *G06V 30/19173* (2022.01)

(58) Field of Classification Search
    CPC ............. G06F 21/6245; G06V 30/19173
    See application file for complete search history.

(56) References Cited

U.S. PATENT DOCUMENTS

| | | | |
|---|---|---|---|
| 8,295,590 B2 | 10/2012 | Filimonova et al. | |
| 10,943,105 B2 | 3/2021 | Chen et al. | |
| 2010/0161460 A1 * | 6/2010 | Vroom | G06Q 40/02 |
| | | | 715/764 |
| 2012/0278266 A1 * | 11/2012 | Naslund | G06N 20/00 |
| | | | 706/45 |
| 2015/0142473 A1 * | 5/2015 | Sethumadhavan | G16H 50/70 |
| | | | 705/3 |

(Continued)

OTHER PUBLICATIONS

Thilina Rajapakse, "Combining Optical Character Recognition and Object Detection for Document Processing" (Jan. 28, 2020). (https://medium.com/skilai/combining-optical-character-recognition-and-object-detection-for-document-processing-e8b9c488d9eb).

(Continued)

*Primary Examiner* — Viet D Vu
(74) *Attorney, Agent, or Firm* — Seyfarth Shaw LLP; Puya Partow-Navid

(57) ABSTRACT

A method for maintaining data privacy includes extracting a group of characters from one or more data fields associated with one or more documents. The method also includes associating a respective image of each character of the group of characters to a digital representation of the respective image based on extracting the group of characters. The method further includes randomly assigning, to each reviewer of a set of reviewers, a group of digital representations based on associating the respective image of each character to the digital representation. Each digital representation of the group of digital representations fails to satisfy a confidence condition. The method still further includes receiving, from each reviewer, a message indicating, for each digital representation of the group of digital representations, whether the respective digital representation is correct or a correction to the respective digital representation.

20 Claims, 5 Drawing Sheets

(56) References Cited

U.S. PATENT DOCUMENTS

2018/0189656 A1* 7/2018 Church .................. G06Q 10/10

OTHER PUBLICATIONS

"Form Parser," Full processor and detail list, Document AI; Google Cloud (retrieved on Jun. 5, 2021). (https://cloud.google.com/document-ai/docs/processors-list#processor form-parser).

"Using Zonal OCR to Extract Data Fields From Scanned Documents," (retrieved Dec. 2017). ( https://docparser.com/blog/zonal-ocr/).

* cited by examiner

RANDOMIZING CHARACTER CORRECTIONS IN A MACHINE LEARNING CLASSIFICATION SYSTEM

CROSS-REFERENCE TO RELATED APPLICATION

The present application claims the benefit of U.S. Provisional Patent Application No. 63/274,343, filed on Nov. 1, 2021, and titled "RANDOMIZING CHARACTER CORRECTIONS IN A MACHINE LEARNING CLASSIFICATION SYSTEM," the disclosure of which is expressly incorporated by reference in its entirety.

FIELD OF THE DISCLOSURE

Aspects of the present disclosure relate generally to machine learning classifications, and more particularly to randomizing corrections of data captured from one or more parsed fields.

BACKGROUND

Businesses and individuals use a variety of structured forms to send and receive data. These forms may be paper forms or electronic forms. In most cases, data included in a form may be captured for further processing. In some examples, the form data may be captured in a digital format, such as extensible markup language (XML), JavaScript object notation (JSON), or comma-separated values (CSV). In some such examples, the form data may be captured via optical character recognition (OCR) systems. To prevent processing errors, it may be desirable to accurately capture the form data. Such OCR systems may use proprietary form-identification models, form-specific field parsers, and/or human readers to manually read the field data and correct errors that may result based on the OCR output. In some examples, the form data may include private or confidential information. In such examples, it may be desirable to randomize the captured data when correcting the errors to maintain the privacy or confidentiality of the form data.

SUMMARY

In one aspect of the present disclosure, a method for maintaining data privacy includes extracting a group of characters from one or more data fields associated with one or more documents. Each document of the one or more documents may be associated with a different set of characters from the group of characters. The method further includes associating a respective image of each character of the group of characters to a digital representation of the respective image based on extracting the group of characters. The method still further includes randomly assigning, to each reviewer of a set of reviewers, a group of digital representations based on associating the respective image of each character to the digital representation. Each digital representation of the group of digital representations may fail to satisfy a confidence condition. The method also includes receiving, from each reviewer based on randomly assigning the group of digital representations, a message indicating, for each digital representation of the group of digital representations, whether the respective digital representation is correct or a correction to the respective digital representation.

Another aspect of the present disclosure is directed to an apparatus including means for extracting a group of characters from one or more data fields associated with one or more documents. Each document of the one or more documents may be associated with a different set of characters from the group of characters. The apparatus further includes means for associating a respective image of each character of the group of characters to a digital representation of the respective image based on extracting the group of characters. The apparatus still further includes means for randomly assigning, to each reviewer of a set of reviewers, a group of digital representations based on associating the respective image of each character to the digital representation. Each digital representation of the group of digital representations may fail to satisfy a confidence condition. The apparatus also includes means for receiving, from each reviewer based on randomly assigning the group of digital representations, a message indicating, for each digital representation of the group of digital representations, whether the respective digital representation is correct or a correction to the respective digital representation.

In another aspect of the present disclosure, a non-transitory computer-readable medium with non-transitory program code recorded thereon is disclosed. The program code is executed by a processor and includes program code to extract a group of characters from one or more data fields associated with one or more documents. Each document of the one or more documents may be associated with a different set of characters from the group of characters. The program code further includes program code to associate a respective image of each character of the group of characters to a digital representation of the respective image based on extracting the group of characters. The program code still further includes program code to randomly assign, to each reviewer of a set of reviewers, a group of digital representations based on associating the respective image of each character to the digital representation. Each digital representation of the group of digital representations may fail to satisfy a confidence condition. The program code also includes program code to receive, from each reviewer based on randomly assigning the group of digital representations, a message indicating, for each digital representation of the group of digital representations, whether the respective digital representation is correct or a correction to the respective digital representation.

Another aspect of the present disclosure is directed to an apparatus for maintaining data privacy. The apparatus includes a processor; and a memory coupled with the processor and storing instructions operable, when executed by the processor, to cause the apparatus to extract a group of characters from one or more data fields associated with one or more documents, each document of the one or more documents associated with a different set of characters from the group of characters. Execution of the instructions further cause the apparatus to associate a respective image of each character of the group of characters to a digital representation of the respective image based on extracting the group of characters. Execution of the instructions still further cause the apparatus to randomly assign, to each reviewer of a set of reviewers, a group of digital representations based on associating the respective image of each character to the digital representation. Each digital representation of the group of digital representations may fail to satisfy a confidence condition. Execution of the instructions also cause the apparatus to receive, from each reviewer based on randomly assigning the group of digital representations, a message indicating, for each digital representation of the group of digital representations, whether the respective digital representation is correct or a correction to the respective digital representation.

Aspects generally include a method, apparatus, system, computer program product, non-transitory computer-readable medium, user equipment, base station, wireless communication device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
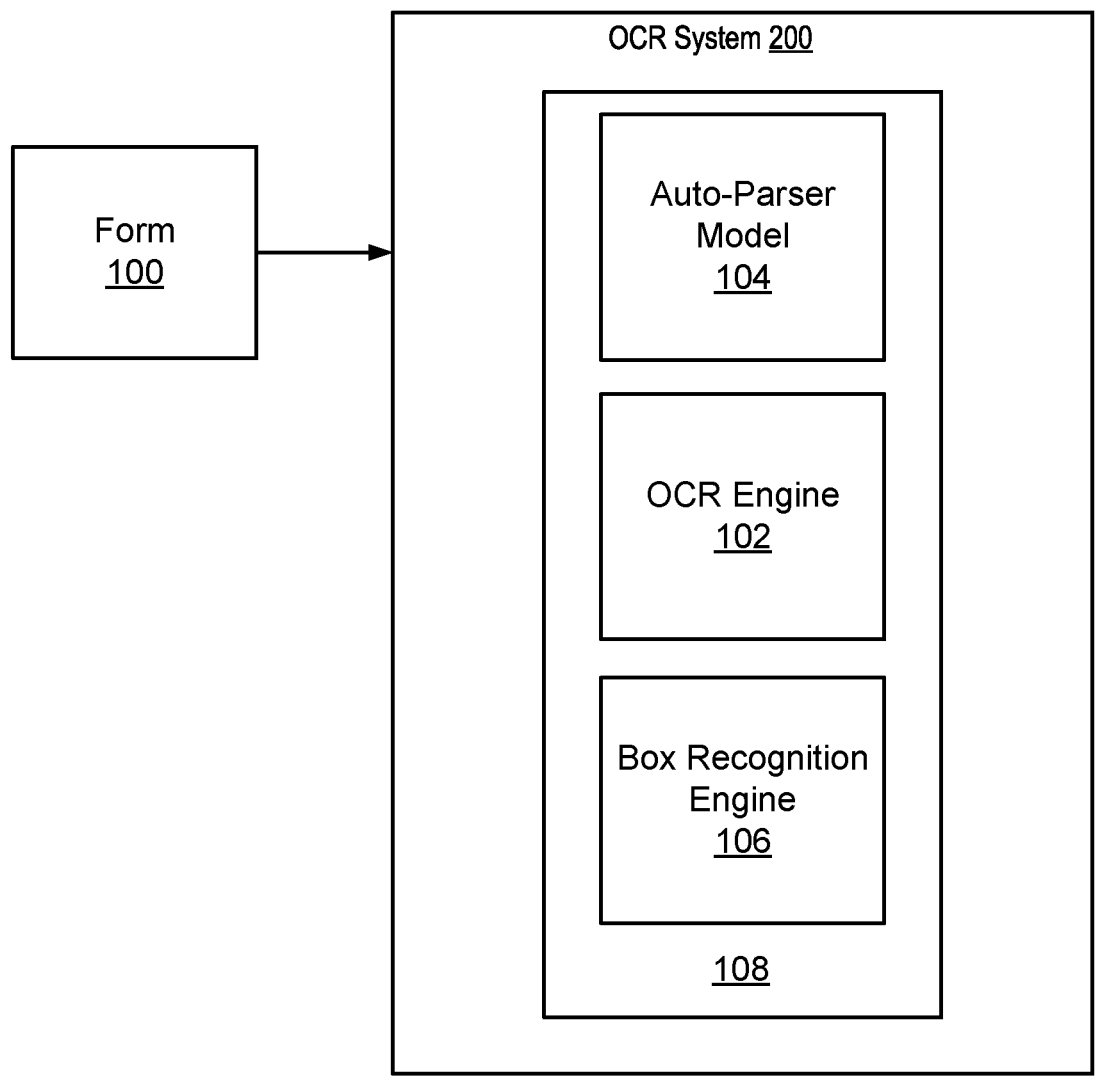
FIG. 1 is a diagram illustrating an example of an optical character recognition (OCR) system, in accordance with aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Based on the teachings, one skilled in the art should appreciate that the scope of the present disclosure is intended to cover any aspect of the present disclosure, whether implemented independently of or combined with any other aspect of the present disclosure. For example, an apparatus may be implemented, or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses or objectives. Rather, aspects of the present disclosure are intended to be broadly applicable to different technologies, system configurations, networks, and protocols, some of which are illustrated by way of example in the figures and in the following description of the preferred aspects. The detailed description and drawings are merely illustrative of the present disclosure rather than limiting, the scope of the present disclosure being defined by the appended claims and equivalents thereof.

As discussed, businesses and individuals use a variety of structured forms to send and receive data. These forms may be paper forms or electronic forms. In most cases, data included in a form may be captured for further processing. In some examples, the form data may be captured in a digital format, such as extensible markup language (XML), JavaScript object notation (JSON), or comma-separated values (CSV). In some such examples, the form data may be captured via optical character recognition (OCR) systems. To prevent processing errors, it may be desirable to accurately capture the form data. Such OCR systems may use proprietary form-identification models, form-specific field parsers, and/or human readers to manually read the field data and correct errors that may result based on the OCR output. In some examples, the form data may include private (e.g., confidential) information. In some conventional systems, the form data may be manually corrected. Manual correction may eliminate the privacy (e.g., confidentiality) of the form data. It may be desirable to randomize the captured data when correcting the errors to maintain the privacy of the form data. Additionally, to maintain the privacy of the form data, it may be desirable to use an autonomous system to correct errors, rather than the manual system (e.g., human based system) used in conventional systems.

Aspects of the present disclosure are directed to a system for extracting form data, classifying the extracted data, and maintaining privacy (for example, confidentiality) of the extracted data when correcting one or more errors caused based on the extraction of the form data. In some examples, to maintain privacy of data, the extracted data is randomized before a correction operation. In some such examples, the correction operation may be performed by a human. In other such examples, to add another layer of privacy, an autonomous system (e.g., computer-implemented system) may be used to correct the form data. In some such examples, an automated character repaint model may add pixels into character images to increase the readability by an OCR system. After the character repaint, the OCR system may recognize the characters at an increased confidence, thereby reducing the need for resources that may be specified for manual correction. In some examples, the form data may be corrected in a remote location with a need for a secure facility or a secure connection.

Particular aspects of the subject matter described in this disclosure may be implemented to realize one or more of the following potential advantages. In some examples, by randomizing extracted form data before a correction operation, techniques disclosed may maintain the privacy of the extracted form data. Additionally, the privacy may be further maintained by using an autonomous process to correct errors in the extracted form data.

FIG. 1 is a block diagram illustrating an example of an optical character recognition (OCR) system, in accordance with aspects of the present disclosure. As shown in the example of FIG. 1, a form 100 may be received at an OCR engine 102. The OCR engine 102 may be a component of an OCR system 200. Although not shown in the example of FIG. 1, the form 100 may include one or more fields that include data (e.g., form data). The form data may be input by a user and/or a device. In some examples, the form 100 may also be referred to as a document. In most cases, a recurring ratio of distances may exist between fields of the form 100. These relative ratios can be used to create a document fingerprint associated with the form 100 and/or a form type associated with the form 100. The form type indicates a given type of the form 100, such as a medical form, in-take form, or another type of form. The document fingerprint may be used to identify the form type among a database of potential form types.

In some examples, the OCR system 200 may know where each field will appear on a given form 100 based on a map of the relative distances to each field. The map may be based on previous forms associated with the form type. In some examples, general coordinates of relative fields may be obtained from the form 100 that is processed by the OCR engine 102. In some examples, the OCR engine 102 generates character position coordinates, and these coordinates may be compared against the known relative field coordinates map to classify each field on the form 100. In some examples, an auto-parser model 104 may classify the form type by comparing the form 100 against its library of document fingerprints. The auto-parser model 104 may be an example of a machine-learning model. Additionally, the auto-parser model 104 may process forms having different rotational alignments, sizes, image quality, and/or other document noise that may prevent automatic document classification, field parsing, and/or subsequent automated data capture.

Additionally, as discussed, fields in the form 100 may identified by boxes (e.g., rectangles) to guide where answers should be written. Such boxes may be recognized by a box-recognition engine 106 to assist in providing a field map that will be included in the form fingerprint. Aspects of the present disclosure may identify field boxes and other lines that formulate the blank form template.

In some examples, the form 100 may have certain symbols or characters (e.g., anchor points) that may have an increased rate of occurrence in comparison to other symbols or characters. The increased rate of occurrence of such symbols or characters may be associated with one or more locations in the form 100. In some examples, these anchor points may be used to predict where the form data will appear. In some examples, the anchor points may be used to identify a form and identify where one or more particular data fields appear, resulting in improvements in a quality of data capture.

In some examples, a font-type may be used for form classification and field identification. In some implementations, the auto-parser model 104 may recognize the font-type in the form 100. In such implementations, the auto-parser model 104 may use the recognized font-type to more accurately identify the form 100 and map the field content of the form 100. Additionally, or alternatively, font styling may be used to identify the form 100 and also identify field locations within the form 100. As an example, fonts may be italicized or emboldened.

In some examples, images and symbols may be used to identify the form 100 and also identify field locations within the form 100. In some implementations, an identity of the form 100 and a map of the field content may be more accurate based on the auto-parser model 104 recognizing images and symbols within the form 100. In some examples, the OCR engine 102, auto-parser model 104, and box-recognition engine 106 may be components of a form processing model 108. The OCR engine 102, auto-parser model 104, and box-recognition engine 106, and form processing model 108 may implement one or both of software or hardware elements. In some examples, the OCR engine 102, auto-parser model 104, and box-recognition engine 106, and form processing model 108 may include trained machine learning models or other artificial intelligence models.

In some implementations, a user-interface may enable a user to designate data fields of a given document using an area-selection tool. In addition, the interface allows the user to assign additional parameters to a selected area to denote other identifying information, such as font type, language, font styling, relevant strings, relevant images/symbols, privacy, and scoring weights of sub-parameters. The parameters may be used to train a document classifier and field parser.

Figure 2:
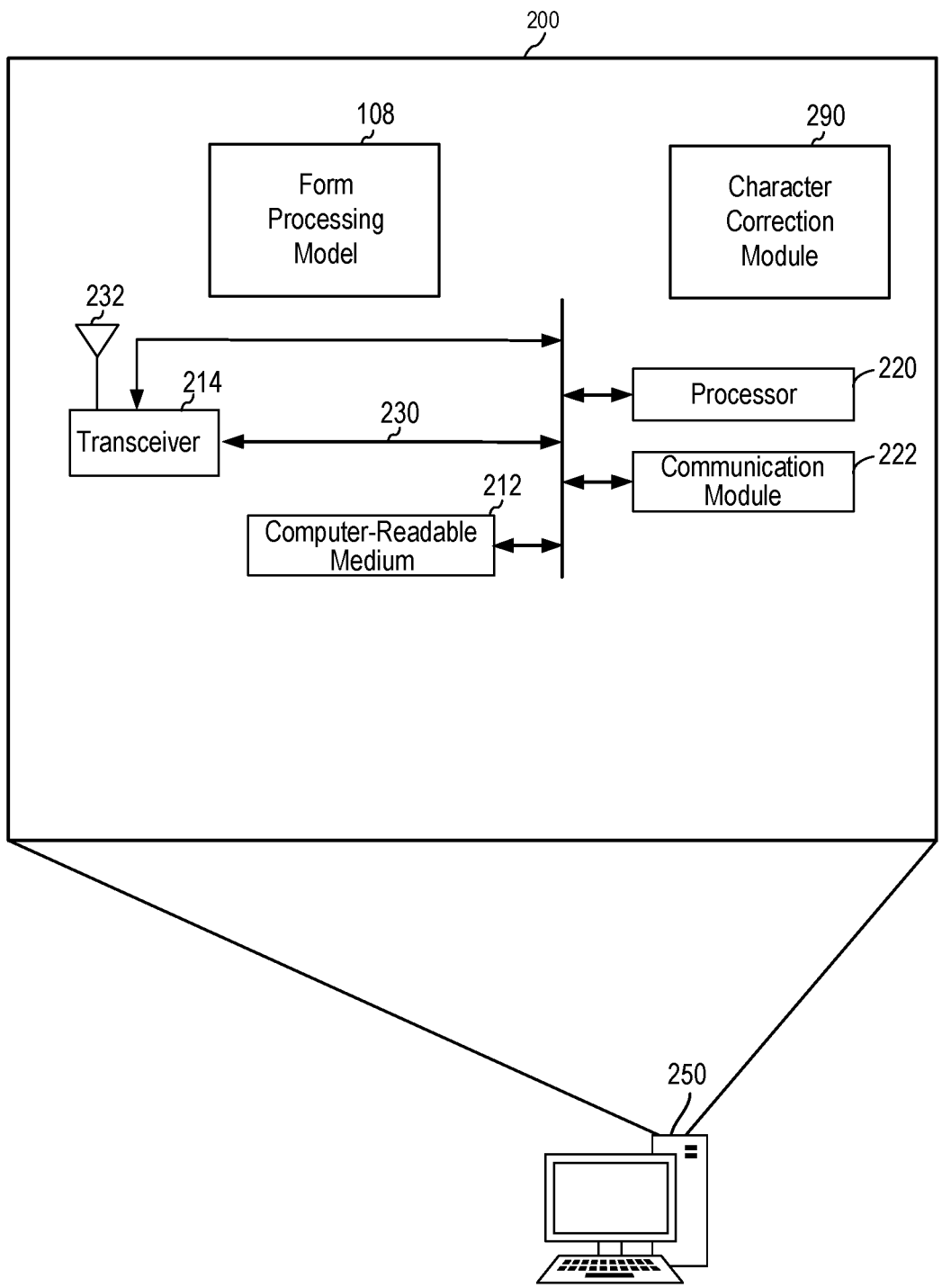
FIG. 2 is a diagram illustrating an example of a hardware implementation for a digital character correction system, in accordance with various aspects of the present disclosure.

FIG. 2 is a diagram illustrating an example of a hardware implementation for an OCR system 200, according to aspects of the present disclosure. The OCR system 200 may be a component of a computing device 250. In the example of FIG. 2, the OCR system 200 may include a character correction module 290. In some examples, the character correction module 290 is configured to perform operations, including operations of the process for randomizing characters extracted from form data described with reference to FIGS. 1, 3, 4, and 5. The character correction module 290 may implement a software architecture. In some examples, the OCR system 200 is a machine learning model that is specifically trained to perform one or more step of the process 400 and/or process 500 described with respect to FIGS. 4 and 5, respectively.

The OCR system 200 may be implemented with a bus architecture, represented generally by a bus 230. The bus 230 may include any number of interconnecting buses and bridges depending on the specific application of the OCR system 200 and the overall design constraints. The bus 230 links together various circuits including one or more processors and/or hardware modules, represented by a processor 220, and a communication module 222. The bus 230 may also link various other circuits such as timing sources, peripherals, voltage regulators, and power management circuits, which are well known in the art, and therefore, will not be described any further.

The OCR system 200 includes a transceiver 214 coupled to the processor 220, the communication module 222, and the computer-readable medium 212. The transceiver 214 is coupled to an antenna 232. The transceiver 214 communicates with various other devices over a transmission medium. For example, the transceiver 214 may receive commands via transmissions from a user or a remote device.

In one or more arrangements, one or more of the modules 212, 214, 220, 222, 290, can include artificial or computational intelligence elements, such as, neural network, fuzzy logic, or other machine learning algorithms. Further, in one or more arrangements, one or more of the modules 212, 214, 220, 222, 290 can be distributed among multiple modules 212, 214, 220, 222, 290 described herein. In one or more arrangements, two or more of the modules 212, 214, 220, 222, 290 of the OCR system 200 can be combined into a single module.

The OCR system 200 includes the processor 220 coupled to the computer-readable medium 212. The processor 220 performs processing, including the execution of software stored on the computer-readable medium 212 providing functionality according to the disclosure. The software, when executed by the processor 220, causes the OCR system 200 to perform the various functions described for a particular device, such as any of the modules 212, 214, 220, 222, 290. The computer-readable medium 212 may also be used for storing data that is manipulated by the processor 220 when executing the software.

The character correction module 290 may be in communication with the transceiver 214, the processor 220, the communication module 222, and the computer-readable medium 313. Working in conjunction with one or more modules 212, 214, 220, 222, 290, the character correction module 290 may extract a group of characters from one or more data fields associated with one or more documents. Each document of the one or more documents may be associated with a different set of characters from the group of characters. Additionally, or alternatively, working in conjunction with one or more modules 212, 214, 220, 222, 290, the character correction module 290 may method associate a respective image of each character of the group of characters to a digital representation of the respective image based on extracting the group of characters. Additionally, or alternatively, working in conjunction with one or more modules 212, 214, 220, 222, 290, the character correction module 290 may randomly assign, to each reviewer of a set of reviewers, a group of digital representations based on associating the respective image of each character to the digital representation. Each digital representation of the group of digital representations may fail to satisfy a confidence condition. Additionally, or alternatively, working in conjunction with one or more modules 212, 214, 220, 222, 290, the character correction module 290 may receive, from each reviewer based on randomly assigning the group of digital representations, a message indicating, for each digital representation of the group of digital representations, whether the respective digital representation is correct or a correction to the respective digital representation.

As discussed, some data included in a form may be private (e.g., confidential). The data included in the form may be referred to as form data. As an example, the form data may include sensitive medical data that is subject to health insurance portability and accountability act (HIPAA) regulations. Additionally, as described, there may be errors during an extraction or classification process of the OCR system. In some examples, the errors may be manually or autonomously corrected during a correction process. In either scenario, transmitting and/or displaying the form data during the correction process may result in a data breach and/or a violation of one or more privacy regulations. Therefore, various aspects are directed to maintain the security of the form data during the correction process.

The correction process is an example of a process for correcting one or more errors in form data. The errors may be due to a failure to properly extract the characters from the form data during an OCR process. Additionally, or alternatively, the errors may be due to a failure in one or more components of an OCR system, such as the OCR system 200 described with reference to FIGS. 1 and 2. During the correction process, a correction model, such as the character correction module 290 described with reference to FIG. 2, may assign a group of characters to a reviewer to review the characters for errors and/or to correct respective errors in the one or more characters. The group of characters may be obtained (e.g., extracted) from one or more fields in one or more forms. In conventional systems, the group of characters may reveal personal identification information, such as, a name, a date of birth, and/or a social security number. In accordance with various aspects of the present disclosure, the correction model may randomly assign one or more characters from one or more fields in one or more forms to each reviewer. The randomness of the assigned characters may be based on a randomness function that randomizes the group of characters included in one or more fields in one or more forms.

Figure 3:
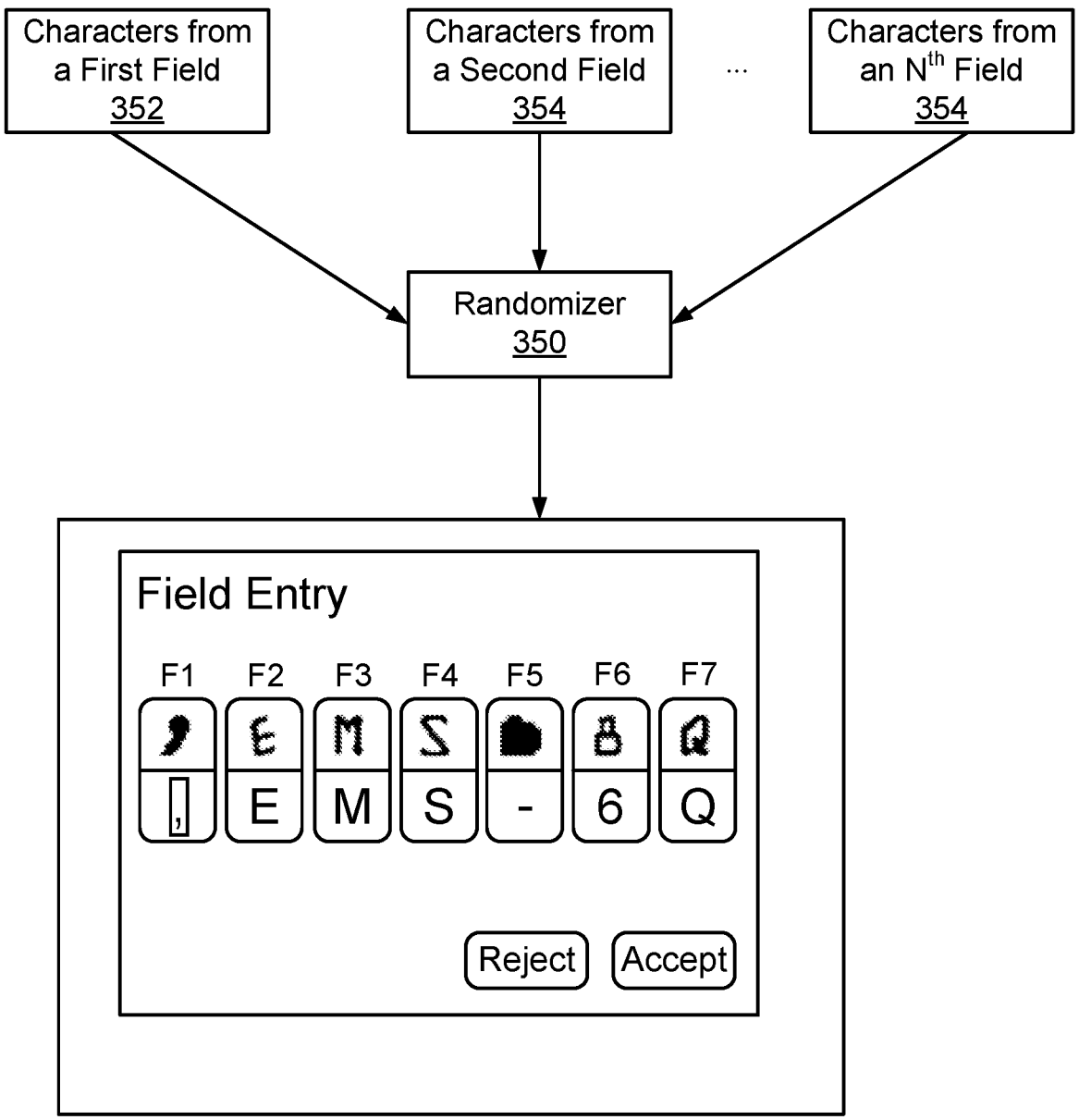
FIG. 3 is a block diagram illustrating an example of group of characters randomly assigned to a reviewer from one or fields included in one or more forms, in accordance with various aspects of the present disclosure.

FIG. 3 is a block diagram illustrating an example of group of characters randomly assigned to a reviewer from one or more fields 352, 354, 356 included in one or more forms, in accordance with various aspects of the present disclosure. In the example of FIG. 3, a correction model, such as character correction module 290 described with reference to FIG. 2, may randomly assign the group of characters (shown in boxes F1 to F7) to a reviewer for review. The group of characters may be randomly assigned by a randomizer 350 from characters extracted from one or fields 352, 354, 356 of one or more forms, such as the form 100 described with reference to FIG. 1. The randomizer 350 may be a function of the correction model. The characters received at the randomizer 350 may be characters that do not satisfy a confidence condition. Alternatively, for added security, the randomizer may also receive one or more characters that satisfied the confidence condition to expand that field of characters that are randomized. Aspects of the present disclosure are not limited to a given number of fields in each form, each form may include one to N fields.

In the example of FIG. 3, each character in the group of characters may be randomly assigned from one or more characters included in one or more fields 352, 354, 356, such as a first field 352, a second field 354, or an $N^{th}$ field 356. A top portion of each box F1 to F7 shows an image of a character extracted from one of the fields 352, 354, 356. In the example of FIG. 3, the fields 352, 354, 356 may include handwritten characters, typed characters and/or characters received from a digital input. Additionally, a bottom portion of each box F1 to F7 shows a digital representation of the extracted character. An optical character recognition model of an OCR system may associate a digitation representation (e.g., digitized character) with the image of the character extracted from the form. The character recognition model may be a component of one or both of the form processing model 108 or the character correction module 290 described with reference to FIGS. 1 and 2. As an example, the top portion of box F2 shows an image of a hand-written "E" that corresponds to a character in one of the fields 352, 354, 356 and the bottom portion of box F2 shows a digital representation of the letter "E". In this example, the digital representation is associated with the character extracted from the form data.

In the example of FIG. 3, the reviewer may review the digital representation associated with each extracted letter to verify if the digital representation is correct. In some examples, a confidence of each digital representation associated with a respective character of the group of characters satisfies a reviewing condition. For example, the reviewing condition may be satisfied if the confidence is less than a threshold. In one example, the optical character recognition model may assign a confidence to each digital representation, the confidence is an example of an accuracy of the digital representation. The correction model may analyze the confidence of each digital representation and flag the digital representation for review. The digital representation may then be associated with the corresponding character image and sent to a reviewer to determine if the digital representation is correct. As shown in the example of FIG. 3, the reviewer may reject the digital representation if it is incorrect, or accept the digital representation if it is correct. The correct and incorrect digital representations may be used as training data to re-train the optical character recognition model. In some examples, the reviewer may input the correct character if the digital representation is incorrect.

In some examples, by randomly assigning the group of characters, a reviewer cannot identify personal identification information from the group of characters. Therefore, should a data leak occur based on a data breach and/or another action (e.g., the reviewer stole the data) the data leak may not yield sensitive information. For example, if the set of characters (e.g., form data) includes a person's full name, a leak of one or two characters, randomly assigned to a reviewer, from the person's name will not result in a data leak. Additionally, the one or two characters are not associated with a source form. In some examples, upon review/correction, the correction model re-assembles the corrected characters back to the source documents, resulting in a high-quality output document ready for shipment to the customer. Aspects of the present disclosure may mitigate a need for facilities and/or OCR systems to expend additional resources for data breach presentation and/or compliance violations. Additionally, aspects of the present disclosure enable high speed and low-cost review and correction of form data by dividing the corrections between a group of reviewers. As discussed, the reviewer may be a human or a device, such as a device trained to correct errors in characters obtained from form data. In some examples, the reviewer may be a component of the correction model.

Figure 4:
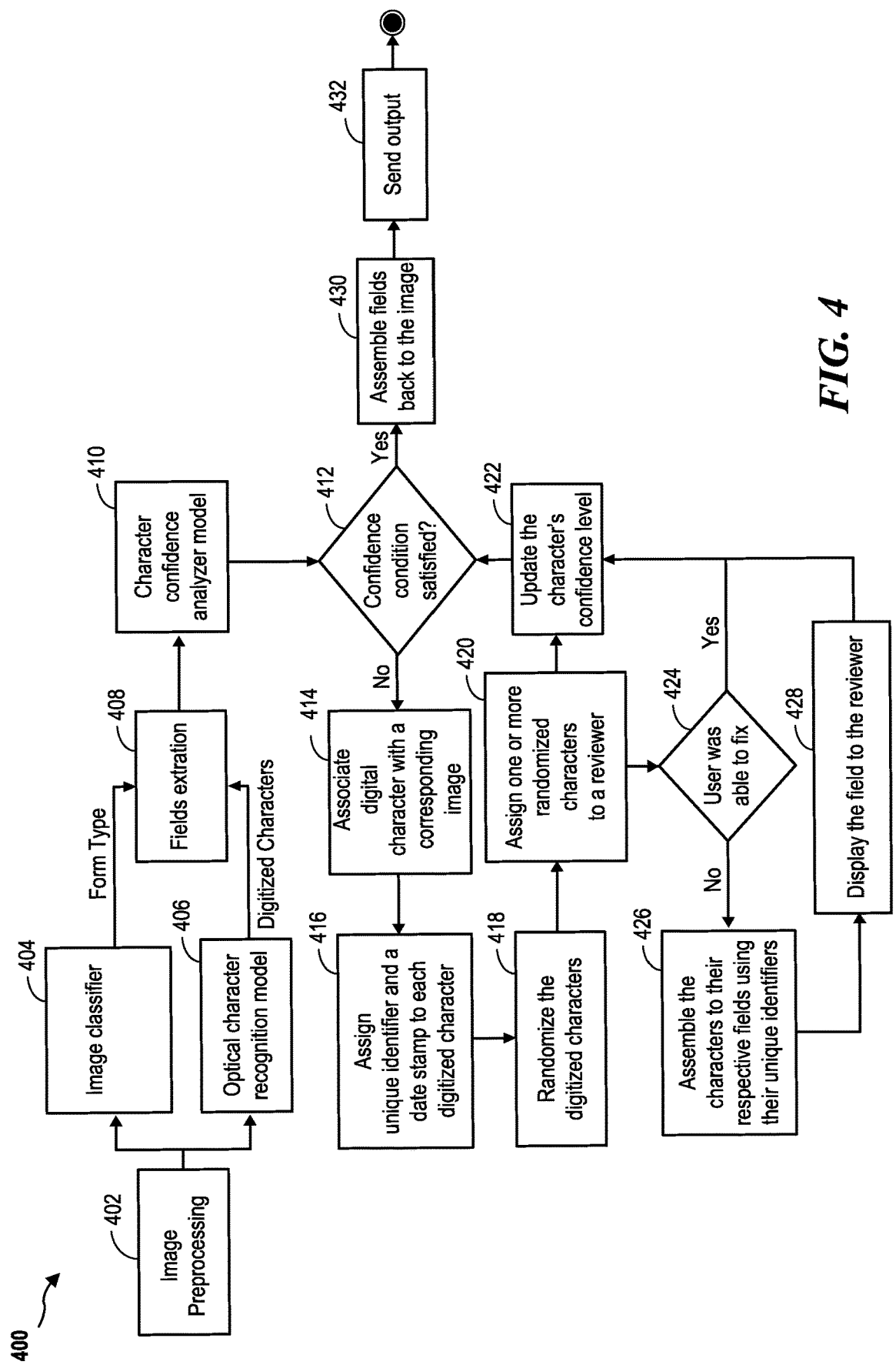
FIGS. 4 and 5 are flow diagrams illustrating examples of a process for correcting one or more characters, in accordance with various aspects of the present disclosure.

FIG. 4 is a flow diagram illustrating an example of a process 400 for correcting one or more characters, in accordance with aspects of the present disclosure. The process 400 may be implemented via an apparatus, such as the OCR system 200 described with reference to FIG. 2. In some examples, the process 400 may use at least one or more of components of the OCR system 200 of FIG. 2. As shown in FIG. 4, the process 400 begins at block 402 by preprocessing each form as an image. The preprocessing may include one or more image conversion steps to reduce image skew, blur, contrast, ink bleeding, resolution enhancement, among many other potential image reformatting techniques. Each form may be an example of the form 100 described with reference to FIG. 1. In some examples, each form may be either a digital scan of a paper form or an electronic form. The paper forms may be scanned by a digital scanner. After preprocessing each image at block 402, the process 400 uses an image classifier model at block 404 to identify a form type associated with the form. Additionally, at block 406, an optical character recognition model may process the image to digitize each character in one or more fields of the form. The optical character recognition model may be a component of one or both of the form processing model 108 or the character correction module 290 described with reference to FIGS. 1 and 2. Each of the characters may be extracted from a form (e.g., document) according to one or more rules. At block 408, the form type and the digitized characters may be processed at a field extraction stage. In some examples, at the field extraction stage a specialized extraction model associated with the form type reviews the specific image of the form and extracts values of the various fields, using their relative locations, to an output file that can be subsequently run through a field validation model and into character, field, or page level manual correction steps thereafter. The extraction models use the layout of the data and relative distances, names, anchor points and other parameters to accurately identify the various finite number of fields listed and extract their values into the output file.

At block 410, a character confidence analyzer model may determine a confidence associated with each digitized character. The character confidence analyzer model may be a component of the character correction module 290 described with reference to FIG. 2. The character confidence analyzer model may be pre-trained to determine the confidence. At block 412, the process 400 determines whether the confidence of each character (e.g., digitized character) satisfies a confidence condition. In some examples, the confidence condition is satisfied if the confidence of the digitized character is greater than or equal to a confidence threshold (e.g., shown as 94% in FIG. 4). Accordingly, the confidence condition may not be satisfied if the confidence is less than the confidence threshold.

In the example of FIG. 4, for each digitized character that does not satisfy the confidence condition at block 412, the process 400 proceeds to block 414. At block 414, the process 400 associates the respective digitized characters that did not satisfy the confidence condition to a corresponding image (e.g., an image of the character extracted from a field in the form). As discussed, FIG. 3 illustrates an example of a digitized character associated with a corresponding image. After associating each digitized character with the corresponding image, the process 400 associates a unique identifier and a time stamp to each digitized character (block 416). One or more of the digitized characters may be inserted into a queue to randomize a subsequent distribution of such characters to reviewers. For example, at block 418, the process 400 then randomizes the digitized characters that did not satisfy the confidence condition. In some examples, the process 400, at block 418, may be performed by a randomizer, such as the randomizer 350 described with reference to FIG. 3. At block 420, the process 400 assigns one or more digital characters from the randomized characters to a reviewer. In some examples, the reviewer may be a human that reviews the assigned characters to reject or approve the digitized characters. The reviewer may also correct any digitized characters that are rejected. In some other examples, the reviewer may be another machine learning model that has been trained to correct errors in digitizing the characters. The reviewer may provide a best character choice for a given character image. The digitized characters may be updated based on the review and the form (e.g., document) may be updated based on the updated digitized characters.

In the example of FIG. 4, for each digitized character assigned to the reviewer, the process 400 determines, at block 424, whether the reviewer approved the digitized character (e.g., the digitized character was correct), rejected the digitized character (e.g., the digitized character was incorrect), and/or corrected the digitized character if the digitized character was rejected. If the reviewer was unable to correct the digitized character, the process 400 moves to block 426, wherein the digitized character is assembled with other characters in their respective field using the respective identifier assigned to each character in the respective field. At block 428, all of the characters in the field are shown to the reviewer, such that the reviewer can recognize a specific word or phrase in order to correct any errors that could not be corrected at block 420.

As shown in FIG. 4, after correcting the errors at block 428, the process 400 proceeds to block 422 to update the confidence level associated with the corrected characters. Additionally, or alternatively, if the reviewer approved the digitized character at block 420 or corrected the digitized character at block 420, the process 400 proceeds from block 424 to block 422 to update the confidence level associated with the corrected characters. The process 400 then proceeds to block 412 to determine whether each character satisfies the confidence condition.

If the digitized character satisfied the confidence condition at block 412, the process 400 proceeds to block 430 to assemble the fields back to the image. The image with the assembled fields may then be transmitted to one or more receivers (block 432). The one or more receivers may be entities designated to receive digital images of the one or more forms.

In some examples, a repaint model may be used for a given image of a single character to improve a rendition of such character image. Upon generation of these improved character images, the digitized characters may be re-processed through one or more OCR engines. The one or more OCR engines may return an array of potential character types sorted by OCR confidence. In some examples, the returned character will have a higher OCR confidence value ascribed than before the repaint model was applied. If the return OCR confidence is higher than the original OCR confidence, then the repaint model may ascribe the new confidence value to the character metadata. Since the relevant workflows are designed to route characters into final output files or into a manual character correction queue based on OCR confidence, the improved confidence in a character's OCR results in saved cost by avoided manual correction of such character.

Additionally, or alternatively, in some aspects, the system may measure the correction quality or labeling quality of the persons or machine learning models entering or labeling each image snippet. In such aspects, the system may present image snippets for which the true label or character is known so that a function can be executed periodically to calculate the quality as required of the persons or models entering or labeling each image snippet. The image snippets may be randomly presented. This method results in the potential for a real time, automated way of ensuring the quality of data being labeled meets the standards of the given application or process. As such, time and money is saved while still ensuring a quality work product.

Figure 5:
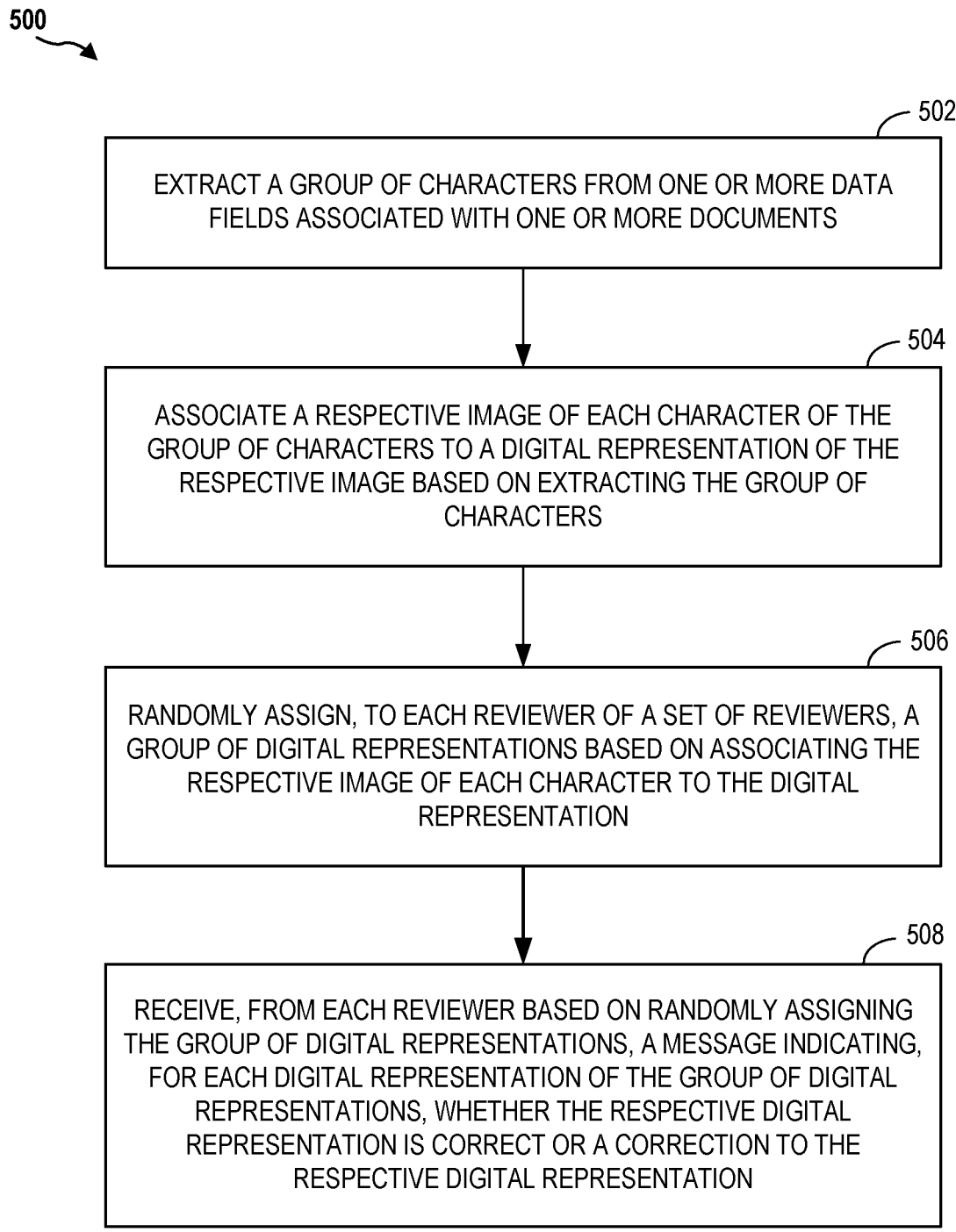

FIG. 5 is a flow diagram illustrating an example process 500 performed by an apparatus, in accordance with some aspects of the present disclosure. The apparatus may be an example of an OCR system 200 described with reference to FIG. 2. The example process 500 is an example of randomizing a group of characters extracted from an image prior to correcting errors in the group of characters. As shown in FIG. 5, the process 500 begins at block 502 by extracting a group of characters from one or more data fields associated with one or more documents. Each document of the one or more documents may be associated with a different set of characters from the group of characters. At block 504, the process 500 associates a respective image of each character of the group of characters to a digital representation of the respective image based on extracting the group of characters. At block 506, the process 500 randomly assigns, to each reviewer of a set of reviewers, a group of digital representations based on associating the respective image of each character to the digital representation. Each digital representation of the group of digital representations fails to satisfy a confidence condition. At block 508, the process 500 receives, from each reviewer based on randomly assigning the group of digital representations, a message indicating, for each digital representation of the group of digital representations, whether the respective digital representation is correct or a correction to the respective digital representation.

As used herein, the term "determining" encompasses a wide variety of actions. For example, "determining" may include calculating, computing, processing, deriving, investigating, looking up (e.g., looking up in a table, a database, or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor configured to perform the functions discussed in the present disclosure. The processor may be a neural network processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. The processor may be a microprocessor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or such other special configuration, as described herein.

The steps of a method or algorithm described in connection with the present disclosure may be embodied directly in hardware, in a software module executed by a processor, or in a combination of the two. A software module may reside in storage or machine-readable medium, including random access memory (RAM), read only memory (ROM), flash memory, erasable programmable read-only memory (EPROM), electrically erasable programmable read-only memory (EEPROM), registers, a hard disk, a removable disk, a CD-ROM or other optical disk storage, magnetic disk storage or other magnetic storage devices, or any other medium that can be used to carry or store desired program code in the form of instructions or data structures and that can be accessed by a computer. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Software shall be construed to mean instructions, data, or any combination thereof, whether referred to as software, firmware, middleware, microcode, hardware description language, or otherwise.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functions described throughout this present disclosure. Those skilled in the art will recognize how best to implement the described functionality for the processing system depending on the particular application and the overall design constraints imposed on the overall system.

The machine-readable media may comprise a number of software modules. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any storage medium that facilitates transfer of a computer program from one place to another. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects, computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means, such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for maintaining data privacy, comprising:
generating, via optical character recognition (OCR), a group of images corresponding to a group of characters from a set of data fields associated with one or more physical documents, each physical document of the one or more physical documents associated with a different set of characters from the group of characters, each image of the group of images corresponding to a respective character of the group of characters;
associating each image of the group of images to a respective digital character representation of a character based on extracting the group of characters;
randomly assigning, to one or more reviewers of a set of reviewers, a respective subset of digital character representations from a group of digital character representations based on associating each image of the group of images to the respective digital character representation, each digital character representation of the respective subset of digital character representations failing to satisfy a confidence condition, each data field of the set of data fields associated with a respective group of digital character representations; and
receiving, from each of the one or more reviewers based on randomly assigning the respective subset of digital character representations, a message indicating, for each digital character representation of the respective subset of digital character representations, whether the respective digital character representation is correct or a correction to the respective digital character representation.

2. The method of claim 1, wherein each digital character representation is associated with a respective confidence value.

3. The method of claim 2, wherein the confidence condition is satisfied based on the respective confidence value being greater than or equal to a confidence threshold.

4. The method of claim 2, further comprising updating the respective confidence value of each digital character representation of the respective subset of digital character representations based on receiving the message.

5. The method of claim 1, wherein updating the respective confidence value increases the respective confidence value.

6. The method of claim 1, wherein at least one data field of the set of data fields is associated with private data.

7. The method of claim 5, wherein the private data is unidentifiable from the respective subset of digital character representations assigned to each of the one or more reviewers.

8. An apparatus for maintaining data privacy, comprising:
at least one processor; and
at least one memory coupled with the at least one processor and storing instructions operable, when executed by the at least one processor, to cause the apparatus to:
generate, via optical character recognition (OCR), a group of images corresponding to a group of characters from a set of data fields associated with one or more physical documents, each physical document of the one or more physical documents associated with a different set of characters from the group of characters, each image of the group of images corresponding to a respective character of the group of characters;
associate each image of the group of images to a respective digital character representation of a character based on extracting the group of characters;
randomly assign, to one or more reviewers of a set of reviewers, a respective subset of digital character representations from a group of digital character representations based on associating each image of the group of images to the respective digital character representation, each digital character representation of the respective subset of digital character representations failing to satisfy a confidence condition, each data field of the set of data fields associated with a respective group of digital character representations; and
receive, from each of the one or more reviewers based on randomly assigning the respective subset of digital character representations, a message indicating, for each digital character representation of the respective subset of digital character representations, whether the respective digital character representation is correct or a correction to the respective digital character representation.

9. The apparatus of claim 8, wherein each digital character representation is associated with a respective confidence value.

10. The apparatus of claim 9, wherein the confidence condition is satisfied based on the respective confidence value being greater than or equal to a confidence threshold.

11. The apparatus of claim 9, wherein execution of the instructions further cause the apparatus to update the respective confidence value of each digital character representation of the respective subset of digital character representations based on receiving the message.

12. The apparatus of claim 8, wherein updating the respective confidence value increases the respective confidence value.

13. The apparatus of claim 8, wherein at least one data field of the set data fields is associated with private data.

14. The apparatus of claim 13, wherein the private data is unidentifiable from the respective subset of digital character representations assigned to each of the one or more reviewers.

15. A non-transitory computer-readable medium having program code recorded thereon for maintaining data privacy, the program code executed by a processor and comprising:
program code to generate, via optical character recognition (OCR), a group of images corresponding to a group of characters from a set of data fields associated with one or more physical documents, each physical document of the one or more physical documents associated with a different set of characters from the group of characters, each image of the group of images corresponding to a respective character of the group of characters;
program code to associate each image of the group of images to a respective digital character representation of a character based on extracting the group of characters;
program code to randomly assign, to one or more reviewers of a set of reviewers, a respective subset of digital character representations from a group of digital character representations based on associating each image of the group of images to the respective digital character representation, each digital character representation of the respective subset of digital character representations failing to satisfy a confidence condition, each data field of the set of data fields associated with a respective group of digital character representations; and program code to receive, from each of the one or more reviewers based on randomly assigning the respective subset of digital character representations, a message indicating, for each digital character representation of the respective subset of digital character representations, whether the respective digital character representation is correct or a correction to the respective digital character representation.

16. The non-transitory computer-readable medium of claim 15, wherein each digital character representation is associated with a respective confidence value.

17. The non-transitory computer-readable medium of claim 16, wherein the confidence condition is satisfied based on the respective confidence value being greater than or equal to a confidence threshold.

18. The non-transitory computer-readable medium of claim 16, wherein the program code further comprises program code to update the respective confidence value of each digital character representation of the respective subset of digital character representations based on receiving the message.

19. The non-transitory computer-readable medium of claim 15, wherein updating the respective confidence value increases the respective confidence value.

20. The non-transitory computer-readable medium of claim 15, wherein:
at least one data field of the set of data fields is associated with private data; and
the private data is unidentifiable from the respective subset of digital character representations assigned to each of the one or more reviewers.

* * * * *